United States Patent [19]
Hylton

[11] Patent Number: 5,656,041
[45] Date of Patent: Aug. 12, 1997

[54] METHOD FOR DETOXIFYING COAL-TAR DEPOSITS

[75] Inventor: Kevin L. Hylton, Mendon, N.Y.

[73] Assignee: Rochester Gas & Electric Co., Rochester, N.Y.

[21] Appl. No.: 658,423

[22] Filed: Jun. 5, 1996

[51] Int. Cl.$^6$ .................... C10L 5/00; C10C 1/00
[52] U.S. Cl. .................. 44/607; 44/621; 44/628; 208/13; 208/44
[58] Field of Search .................. 44/622, 628, 607, 44/621; 208/121, 44, 39, 28

[56] References Cited

U.S. PATENT DOCUMENTS

| | | |
|---|---|---|
| 1,429,992 | 9/1922 | Woegerer .................. 208/121 |
| 1,434,300 | 10/1922 | Lightenhome .................. 208/121 |
| 1,827,018 | 10/1931 | Jenkins .................. 208/121 |
| 2,034,712 | 3/1936 | Dolbear .................. 208/283 |
| 2,364,390 | 12/1944 | Schaafsma .................. 208/226 |
| 2,970,956 | 2/1961 | Shiah .................. 208/226 |
| 3,861,885 | 1/1975 | Schora . |
| 3,909,364 | 9/1975 | Singh . |
| 4,305,809 | 12/1981 | Chen et al. .................. 208/127 |
| 4,392,941 | 7/1983 | Roth et al. .................. 208/39 |
| 4,409,094 | 10/1983 | Longwell et al. . |
| 4,436,615 | 3/1984 | Boodman et al. .................. 208/39 |
| 4,477,331 | 10/1984 | Reed et al. . |
| 4,515,601 | 5/1985 | Charters . |
| 4,529,497 | 7/1985 | Watson et al. . |
| 4,608,126 | 8/1986 | Watson et al. . |
| 4,787,323 | 11/1988 | Beer et al. . |
| 4,824,438 | 4/1989 | McCrainor et al. . |
| 4,863,485 | 9/1989 | Schaffer et al. . |
| 4,981,667 | 1/1991 | Berg et al. . |
| 5,071,447 | 12/1991 | Koppelman . |
| 5,104,518 | 4/1992 | Jäger .................. 208/39 |
| 5,128,021 | 7/1992 | Romey et al. . |
| 5,236,470 | 8/1993 | Levin . |
| 5,265,545 | 11/1993 | Milner . |
| 5,455,005 | 10/1995 | Clawson et al. . |

FOREIGN PATENT DOCUMENTS 0056006  1/1985  Japan .................. 208/121

Primary Examiner—Margaret Medley
Attorney, Agent, or Firm—Martin Lukacher

[57] ABSTRACT

In a process for detoxifying a coal-tar deposit, effective amounts of carbon and a calcium oxide containing substance are added at a mixing station to at least a portion of the coal-tar deposit. The reaction mixture thus formed is mixed at a temperature of about 70° F. to 130° F. for a time sufficient to detoxify it and convert it into a non-hazardous reaction product. The coal-tar deposit may be either a substantially homogeneous coal-tar or a heterogeneous coal-tar contaminated substrate. The mixing station site may be either subsurface or surface and may include a container. The non-hazardous reaction product may be separated into small particles, suitable as fuel, and large particles, suitable as safe fill.

30 Claims, 3 Drawing Sheets 5,656,041

METHOD FOR DETOXIFYING COAL-TAR DEPOSITS

FIELD OF THE INVENTION

The present invention generally relates to the field of environmental clean-up techniques and more specifically relates to a method of detoxifying an area that has been contaminated by coal-tar.

BACKGROUND OF THE INVENTION

A large number of manufactured gas plants (MGPs) exist throughout the United States. Coal-tar is an omnipresent by-product of the manufacturing process at MGPs. The coal-tar has often been allowed to remain on site in coal-tar pits, gas holders, or tar wells, or is otherwise dumped nearby and then allowed to commingle with heterogenous substrate of soil, organic material and other debris. The coal-tar presents itself in the form of a thick highly viscous substance containing very high concentrations of organic chemicals, some of which are either proven or suspected of being carcinogenic in humans. Often such coal-tar deposits are hazardous wastes which must be disposed of at great expense.

When a coal-tar deposit is allowed to sit on-site, it has the potential to become admixed with sand, rock, wood, soil, metals and any other debris present at or below the surface. It is this coal-tar commingled debris that creates a significant, difficult and expensive materials management problem. Purer coal-tar deposits can be cleaned up laboriously by collecting and incinerating the coal-tar from the contaminated area. However, such method is very expensive and leaves large excavated expanses which require new fill, adding to the clean-up expense.

The clean-up process is further complicated when the coal-tar has contaminated and is commingled with e.g. sand, rock, gravel, soil, metals, wood, etc.

It is the principal feature of this invention to provide a simplified and inexpensive method of cleaning up coal-tar contaminated debris thereby detoxifying a site contaminated by coal-tar.

SUMMARY OF THE INVENTION

The present invention provides an improved process for treating and detoxifying coal-tar contaminated deposits and using such detoxified deposits as inexpensive fuel sources and/or safe fill which can be returned to the earth.

In accordance with the invention, rotatable mixing apparatus is provided for mixing coal-tar contaminated substrate, carbon and a calcium oxide containing substance. The mixing may take place in a container holding the coal-tar substrate and the carbon and calcium oxide containing substance or for certain coal-tar containing sites, in situ, as in a coal-tar well. The mixing apparatus comprises a barrel section connected to a frame housing. A drive rotates the barrel section. A plurality of projections are fixably attached to and extend radially outward from the barrel section at the same or varying angular degrees. A protective guard surrounds the length of the mixing feature and connects fixably to the frame. The guard allows the barrel section to rotate freely (without engaging the guard), but protects the projections and barrel section from engaging the inside of the container which could, over time, lead to damage of either the mixing fixture, the projections or the container.

DETAILED DESCRIPTION OF THE INVENTION

The process of the present invention is applicable for detoxifying coal-tar contaminated or commingled substrate. The process described herein can be used to detoxify coal-tar contaminated substrates such as wood, soil, sand, ash, rock, bricks, brick parts, rubble, metal and other inorganics, peat, and other organics or to detoxify neat (uncontaminated) coal-tar to create a non-hazardous waste product that can be recycled, used as a fuel source, or can be disposed in a much less expensive manner than is ordinarily done with hazardous waste.

"Non-hazardous", may be as defined by the Federal Resource Conservation and Recovery Act.

Figure 1:
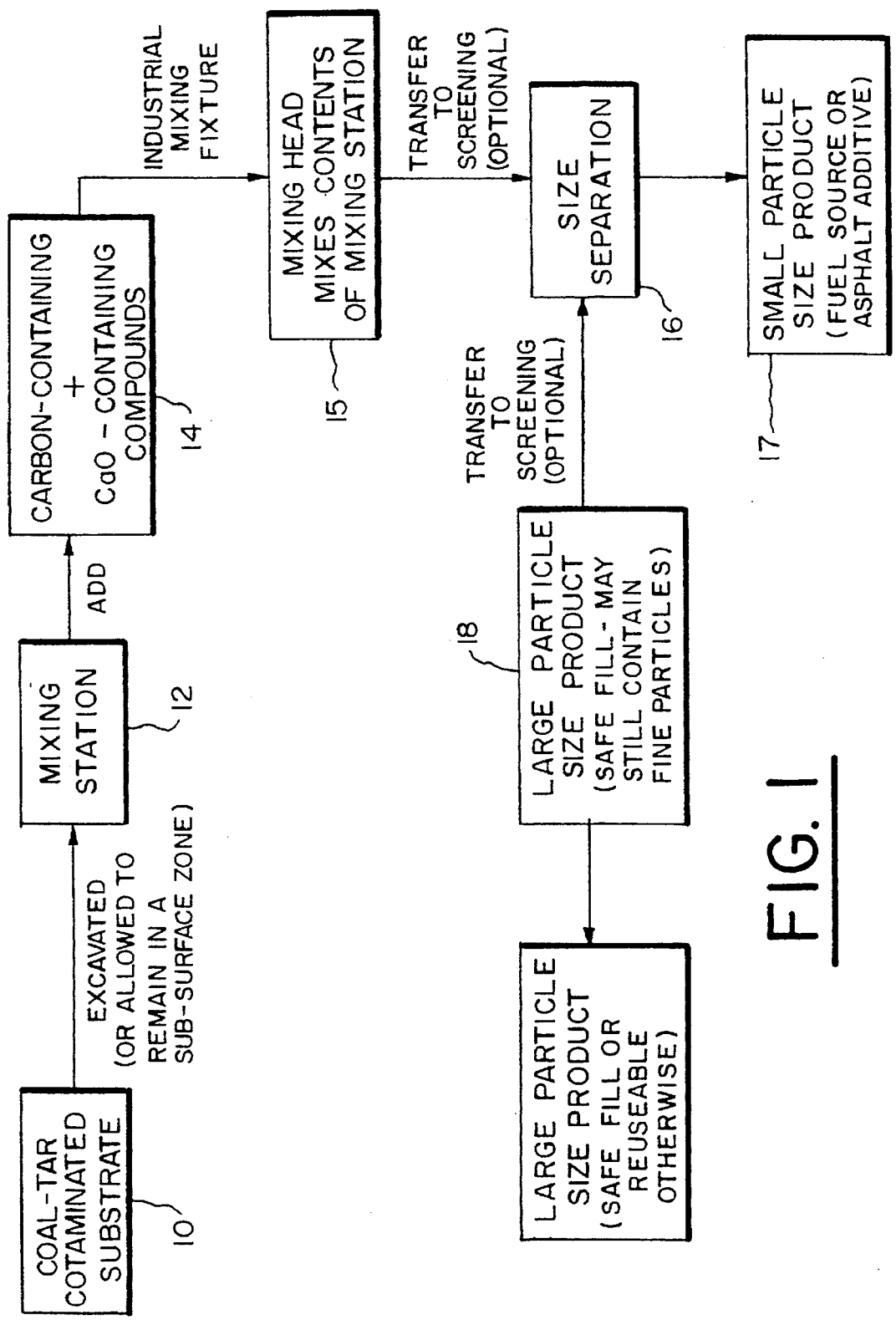
FIG. 1 is a schematic flow chart shows a process according to the present invention.
Figure 2:
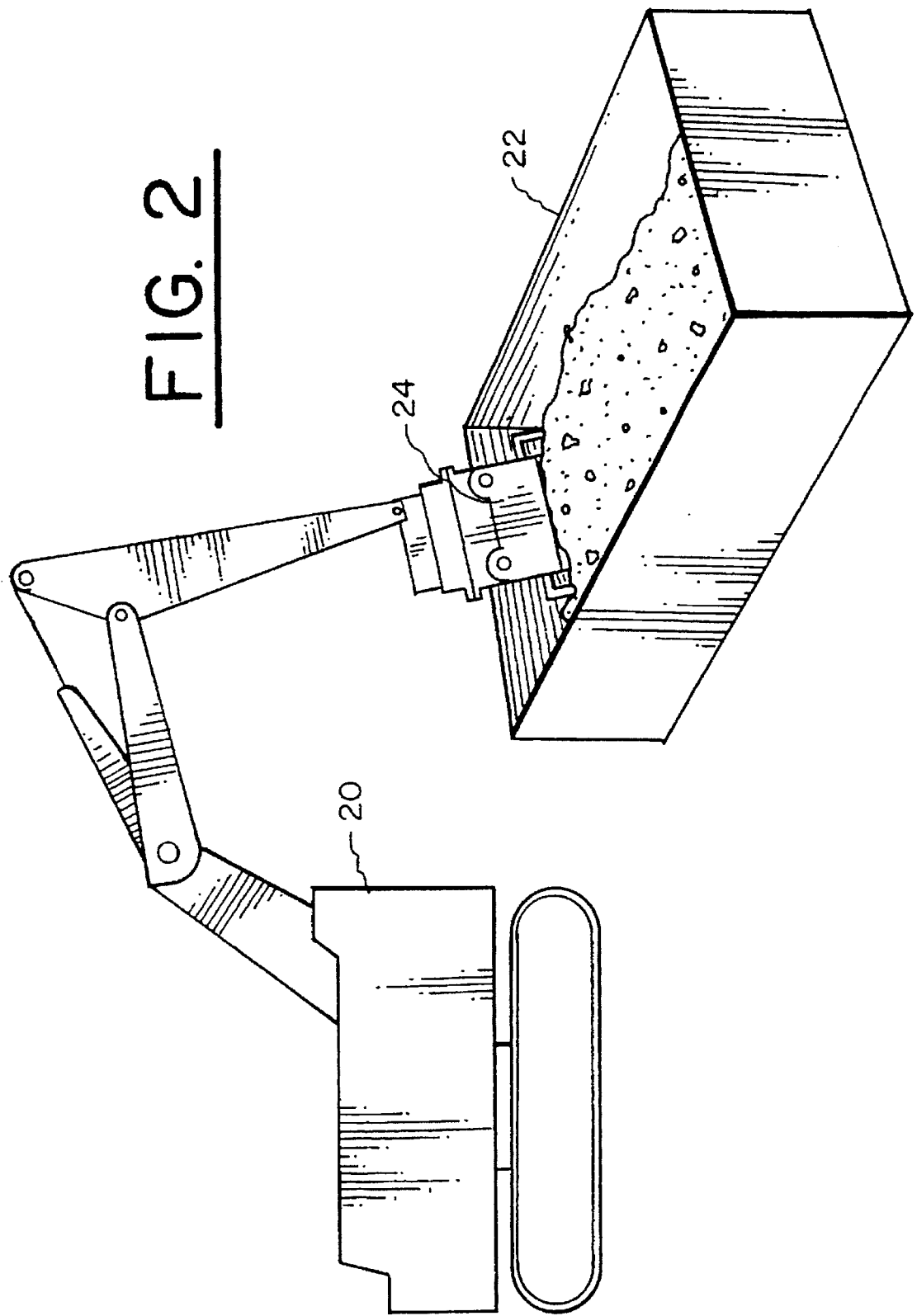
FIG. 2 is a drawing apparatus attached to an excavator for mixing the coal-tar contaminated substrate in the reaction mixture.

According to the present process, soil, rock and other heterogeneously coal-tar contaminated debris is excavated from a site (a coal-tar contaminated substrate 10 (FIG. 1) with a large excavator 20 (FIG. 2). The excavated coal-tar impregnated material is dumped into mixing station 12 which may be a container provided by a large rectangular metal bin 12, the dimensions of which are not critical, but which may be preferably a 30 foot×10 foot×7 foot metal bin. The bin 22 is filled to about 40–60% capacity. An amount of carbon and calcium oxide containing material is added to the coal-tar contaminated contents 14. The carbon containing material is selected from the group including petroleum coke, and waste carbon containing material such as unusable or out of specification (off-spec) activated carbon mixed with coal or other high carbon waste product with suitable characteristics, with off-spec activated carbon mixed with coal being particularly preferred. Off-spec carbon material is unsuitable for its intended purpose by virtue of variance in particle size, moisture content, and other specified characteristics. It can be obtained cheaply since it is a waste product, but it may be used in the detoxifying process of this invention. When the bin 12 is filled to approximately 50% capacity (12 tons), it has been determined (depending upon the amount of moisture in both the carbon and the substrate, the adsorptive capacity of the carbon used, the temperature of the mixture, the quantity of calcium oxide added, and the amount of volatile and semi-volatile organic chemicals present in the coal tars) that an approximately equal weight (12 tons) of carbon should be added to the mixture. Next, approximately 2.7 percent by weight (640 pounds) of calcium oxide is added to the reaction mixture. It has been experimentally determined that when the bin is filled to about 50% capacity with the coal-tar contaminated substrate (twelve tons), and an equal amount (twelve tons) of preferred carbon containing material is present, 2.7 percent by weight (640 pounds) of quicklime is to be added to the reaction mix for a good (fast) coal-tar detoxification result.

In the preferred embodiment, the temperature of the reaction mixture is preferably kept within the range of from about 70° F. to about 130° F., more preferably 80° F. to about 110° F. by the addition of the calcium oxide. The temperature is critical only in that it is highly desired that the carbon and calcium oxide strip and adsorb the coal-tar from the coal-tar impregnated and contaminated substrate. If the temperature rises too high (above 130° F.), the various organic and hazardous substituents of the coal-tar will volatilize with increasing rapidity, being released into the atmosphere, thus resulting in an additional toxic and hazardous condition.

Figure 3:
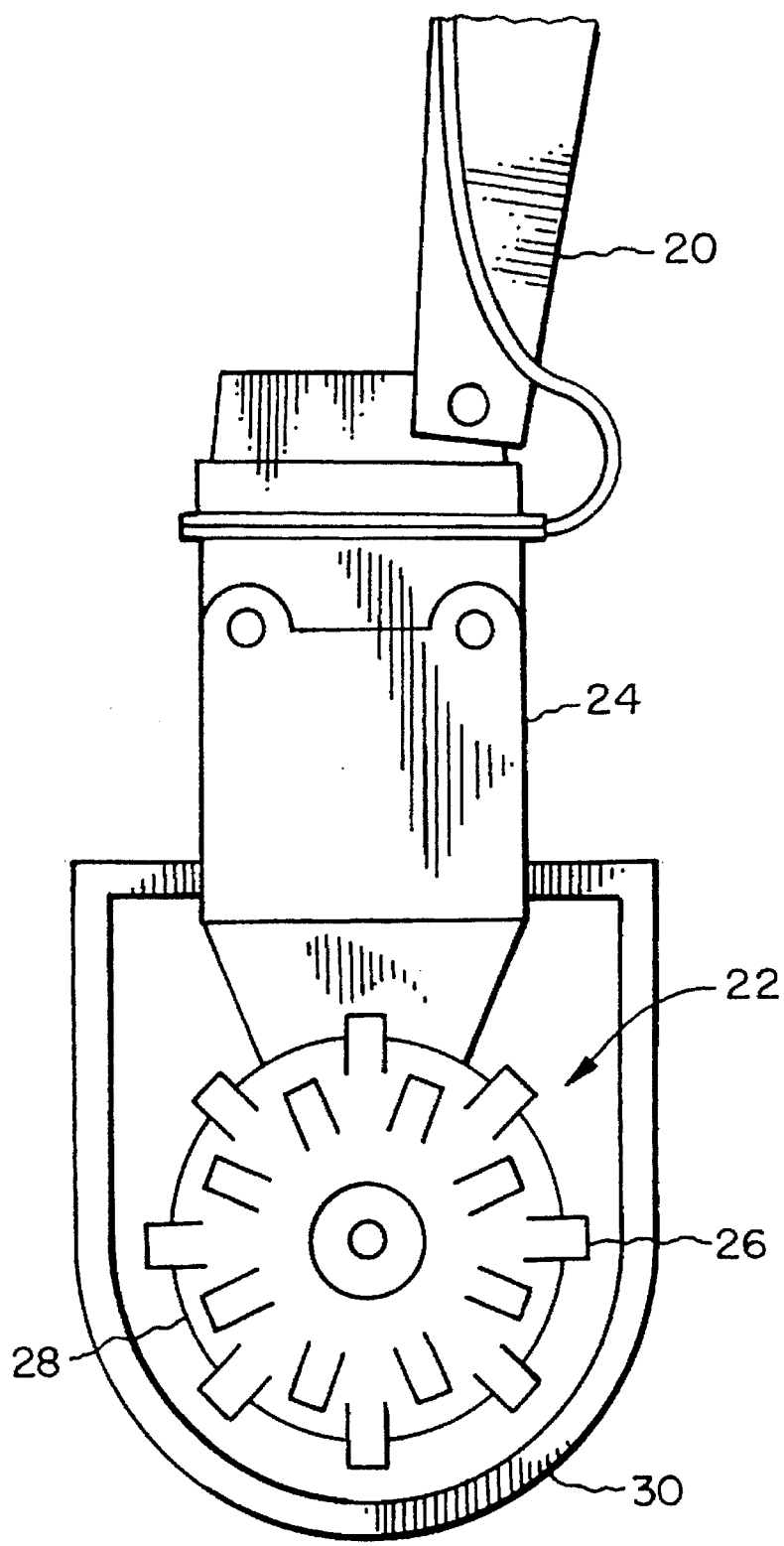
FIG. 3 is a close-up view of the mixing apparatus showing the use of a guard thereof.

The reaction mixture 15 (FIG. 1) is mixed most preferably with the aid of a high torque mixing head 24 (FIGS. 2 and 3), such as a Mitsui MT 2000 mixing head, or equivalent attached to the large excavator 20. The excavator lowers the mixing head into the bin 22, housing the reaction mixture. The operator engages the head, causing rotation of the head which drives the finger-like projections 26 on the barrel 28 of the mixing head through the reaction mixture. A protective guard 30 is disposed around the rotating parts of the head 22. The operator then directs the rotating head into and along the length of the mixture to thoroughly mix the contents. Altering the ratio of the constituents of the reactant mix will also affect the total required mixing time. Also, not all tars, carbons and moisture will be consistent and will affect the mixing time. For the following reactant amounts as shown below the average mixing times required are shown:

| Coal-tar material | 12 tons |
|---|---|
| Carbon | 12 tons |
| CaO | 0.32 tons |
| Mixing time/speed | 40 minutes, 66 RPM |

When the mixing is completed, the resulting reaction product has visibly changed to a black powder similar to a black dirt. However, all visible evidence of the formerly present coal-tar is gone. Large chunks of heterogenous material such as metal, wood, and rock are visible and the coal-tar that had once coated the substrate has been mostly removed.

The reaction product is then directed to a screening processing plant as by use of the excavator. The excavator removes the detoxified material from the reaction bin and drops it onto, for example, a Kohlberg model 271 hammermill/screening plant which performs size separation (16, 17, 18—FIG. 1). The hammermill breaks up large chunks of material into smaller pieces and continues to cleanse the larger pieces of metal, wood and rock, while the screening phase of the machine performs a size separation process. In this way, a final product of desired size desired moisture content, desired lime content and desired carbon content etc. can be produced. The small particle product can be burned as a fuel source with its toxic effect after incineration now well within the state and federal regulations. Other uses are as an asphalt ingredient or may be recycled or disposed of safely and as non-hazardous solid waste. In addition, the product has been recycled to be a useful fuel source, thus adding value and further reducing operating expense. The product can be safely burned, especially in a utility boiler or other high efficiency furnace or incinerator.

The larger debris with one or two passes through the screening plant, has now been sufficiently cleansed of the hazardous coal tar, and may be replaced on site into the original excavated area with appropriate regulatory approvals, thus obviating the need and expense, for remote disposal, or the purchase of new fill.

Many other modifications and variations of the present invention are possible to the skilled practitioner in the field in light of the teachings herein. It is therefore understood that, within the scope of the claims, the present invention can be practiced other than as herein specifically described. As shown in FIG. 1, the mixing station may be within the bounds of a subsurface site—such as a subsurface structure, for example a tar pit, well or gas holder wherein the coal-tar deposit is located. Then, excavation and a separate container is not needed.

I claim:

1. A process for detoxifying a coal-tar deposit comprising:

adding at a mixing station effective amounts of carbon and a calcium oxide containing substance to at least a portion of said coal-tar deposit, thereby forming a reaction mixture; and mixing said reaction mixture at a temperature of from about 70° F. to about 130° F. for a time sufficient to detoxify the reaction mixture and convert it into a non-hazardous reaction product.

2. The process according to claim 1 wherein said coal-tar deposit comprises substantially homogeneous coal tar.

3. The process according to claim 1 wherein said coal-tar deposit comprises a heterogeneous coal-tar contaminated substrate.

4. The process according to claim 1 further comprising the steps of:

identifying a coal-tar deposit site;

removing at least a portion of said coal-tar deposit from said site; and transferring at said removed portion of coal-tar deposit to a container at said mixing station.

5. The process according to claim 4 wherein said mixing station is situated at a subsurface site containing said coal-tar deposit.

6. The process according to claim 5 wherein said subsurface site is selected from the group consisting of a gas holder, a tar pit, and a tar well.

7. The process according to claim 3, wherein said coal-tar contaminated substrate comprises components selected from the group consisting of wood, rock, sand, soil, metals, brick, rubble and parts and mixtures thereof.

8. The process according to claim 1 wherein said carbon is selected from the group consisting of petroleum coke and activated carbon coal.

9. The process according to claim 1, wherein said calcium oxide containing substance is quicklime.

10. The process according to claim 1, wherein the temperature is from about 80° F. to about 110° F.

11. The process according to claim 1, wherein said mixing is carried out using a high torque rotatable mixing head.

12. The process according to claim 1, wherein said reaction mixture contains said carbon and said portion of said coal-tar deposit in approximately equal amounts by weight.

13. The process according to claim 12, wherein said reaction mixture contains said calcium oxide containing substance in an amount about 2.7 weight percent of said carbon.

14. The process according to claim 1 further comprising:

breaking up said non-hazardous reaction product into particles.

15. The process according to claim 14, further comprising collecting said small particles for use as a fuel source, asphalt ingredient, or for recycling or disposal.

16. A method for detoxifying a coal-tar deposit comprising:

providing at a mixing station a reaction mixture comprising at least a portion of said coal-tar deposit, an effective amount of a carbon reactant, and an effective amount of a calcium oxide containing reactant; and mixing said reaction mixture at said mixing station to form a non-hazardous reaction product while maintaining the temperature of the reaction mixture and reaction product in the range of from about 70° F. to about 130° F.

17. The method according to claim 16 wherein said mixing is carried out using a high torque rotatable mixing head.

18. The method according to claim 16 further comprising: separating the reaction product into small particle reaction product and large particle reaction product by screening.

19. The method according to claim 18, further comprising: collecting said small particle reaction product, which is suitable for use as a fuel source.

20. The method according to claim 18, further comprising: collecting said large particle reaction product, which is suitable for use as safe fill.

21. The method according to claim 17 wherein said mixing is carried out by embedding and rotating said head in said reaction mixture while said mixture is confined at a surface or subsurface mixing station.

22. The method according to claim 16, wherein said coal-tar deposit comprises a heterogeneous coal-tar contaminated substrate containing components selected from the group consisting of wood, rock, ash, sand, soil, metals, brick, rubble, and parts and mixtures thereof.

23. The method according to claim 16 wherein said carbon reactant is selected from the group consisting of petroleum coke, activated carbon, coal, and mixtures thereof.

24. A carbon containing fuel source made by the method of claim 16.

25. The method according to claim 16, wherein said reaction mixture contains said carbon reactant and said portion of said coal-tar deposit in approximately equal amounts by weight.

26. The method according to claim 25, wherein said reaction mixture contains said calcium oxide containing reactant in an amount about 2.7 weight percent of said carbon.

27. The process according to claim 15, further comprising safely burning said small particle reaction product.

28. The process according to claim 14, further comprising collecting said large particles for use as a safe fill.

29. The process according to claim 28, further comprising returning said large particle reaction product to a coal-tar deposit site.

30. The process according to claim 14 further comprising: screening said particles to separate large particles from small particles.

* * * * *